(No Model.) 3 Sheets—Sheet 1.

G. E. DAVIS & C. R. LOOK.
INCUBATOR.

No. 339,153. Patented Apr. 6, 1886.

Witnesses:
S. A. Owen
Wm. Pettersen

Inventor:
Geo E Davis
Charles R Look
By his Att'y (No Model.) 3 Sheets—Sheet 2.

G. E. DAVIS & C. R. LOOK.
INCUBATOR.

No. 339,153. Patented Apr. 6, 1886.

Witnesses:
S. A. Owen
Wm Patterson

Inventor:
Geo E Davis
Charles R Look
By His Att'y,
Alphonso Smith (No Model.)  3 Sheets—Sheet 3.

G. E. DAVIS & C. R. LOOK.
INCUBATOR.

No. 339,153.  Patented Apr. 6, 1886.

Witnesses:
S. A. Owen
Wm Patterson

Inventor:
Geo. E. Davis
Charles R. Look
By his Atty,
Alphonso B. Smith

N. PETERS, Photo-Lithographer, Washington, D. C.

UNITED STATES PATENT OFFICE.

GEORGE E. DAVIS AND CHARLES R. LOOK, OF EAST OAKLAND, ASSIGNORS, BY MESNE ASSIGNMENTS, TO GEORGE E. DAVIS, OF BROOKLYN, CAL.

INCUBATOR.

SPECIFICATION forming part of Letters Patent No. 339,153, dated April 6, 1886.

Application filed February 20, 1885. Serial No. 156,581. (No model.)

*To all whom it may concern:*

Be it known that we, GEORGE E. DAVIS and CHARLES R. LOOK, of East Oakland, county of Alameda, State of California, have invented a novel and useful Incubator; and we hereby declare that the following is a full, clear, and exact description of the same, reference being had to the accompanying drawings.

Our invention relates to a novel means for hatching by artificial heat the eggs of domestic fowls; for protecting the chicks from accident while in the egg-chamber; for protecting the eggs not hatching from being fouled by those which are hatching, and for reducing the percentage of loss.

The following description fully explains the nature of our said invention and the manner in which we proceed to construct, apply, and use the same, the accompanying drawings being referred to by figures and letters.

Figure 1:
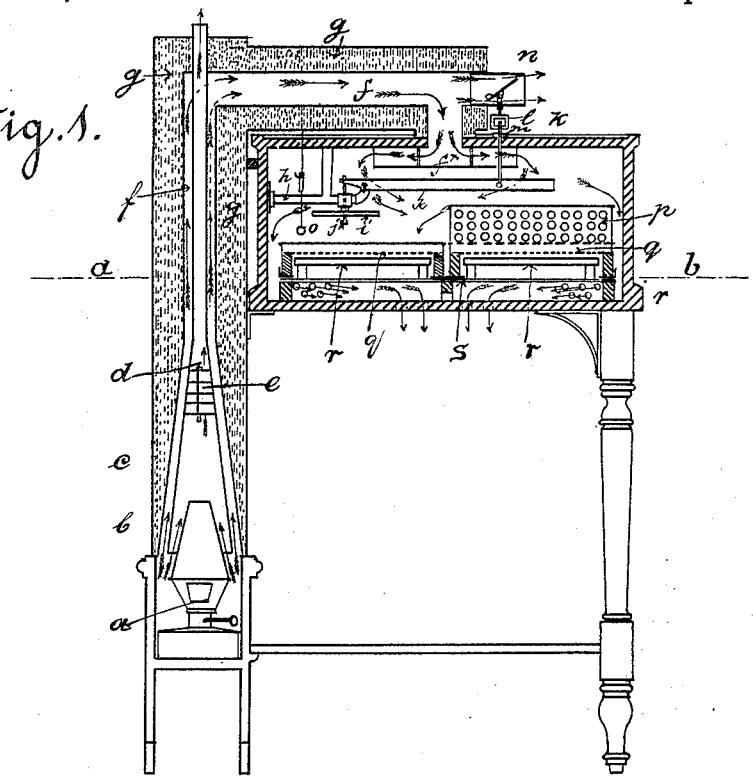
Figure 2:
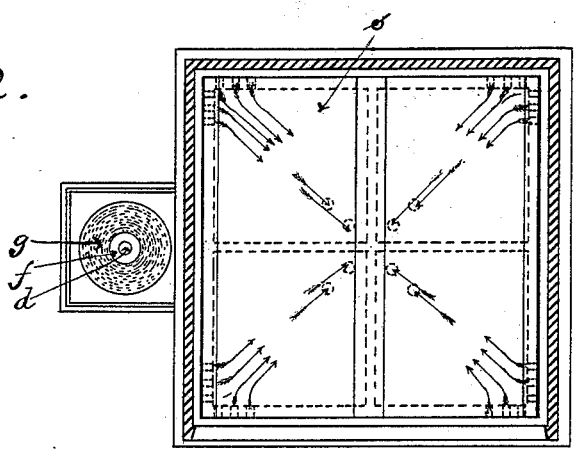
Figure 3:
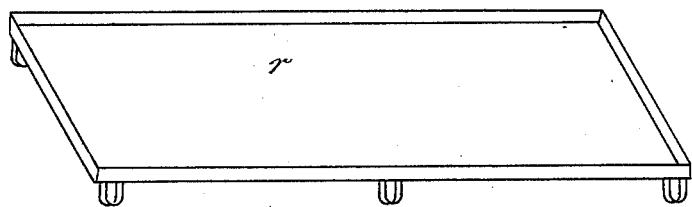
Figure 4:
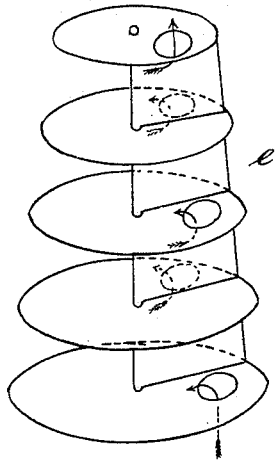
Figure 5:
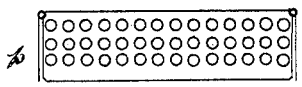
Figure 6:
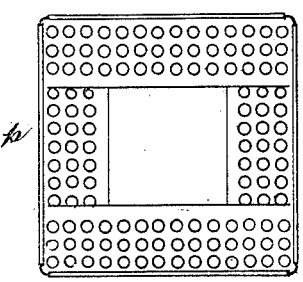
Figure 10:
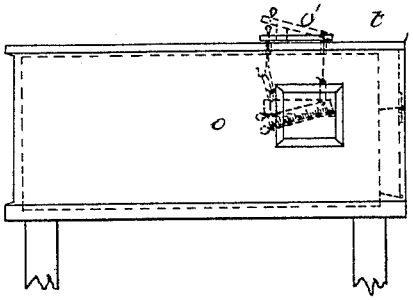
Figure 7:
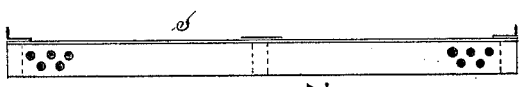
Figure 8:
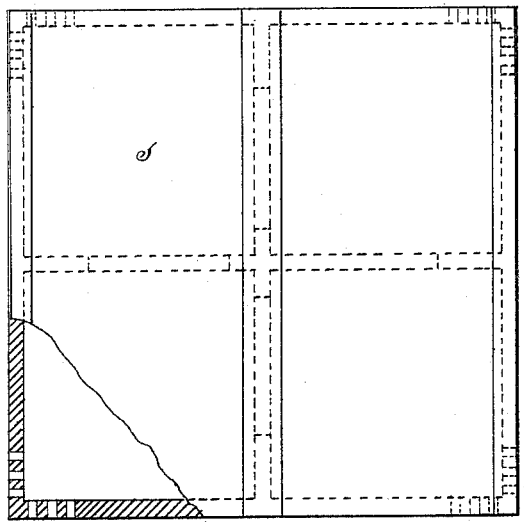
Figure 9:
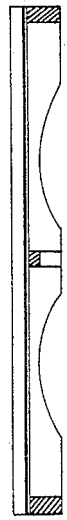

Figure 1 represents a section through the center of the incubator. Fig. 2 is a plan view on the line $a\,b$, Fig. 1. Fig. 3 is a perspective view of the evaporating-pan. Fig. 4 is a perspective view of the labyrinth, the arrows showing the passage of fumes from the lamp. Fig. 5 is an end view of the folding hatching-cage. Fig. 6 is a plan view of the same, showing the cage folded. Fig. 7 is a view in elevation of the false bottom. Fig. 8 is a plan view of the false bottom, with one corner broken off to show the passage of vitiated air from the egg-chamber. Fig. 9 is a section of the same through the line $c\,d$. Fig. 10 gives a view of the window in the egg-chamber and the suspended thermometer.

The incubator is mounted upon a suitable frame or support, on one side of which we place the heater or lamp $a$, in a flume or part containing the hot-air flue $f$, the walls of which flue or passage $f$ are filled with non-conducting material, as shown at $g$. The lower portion of the flue $f$ is conical, as shown at $c$, and a correspondingly-shaped chimney, $d$, has its lower conical end setting over the lamp-chimney proper, and the upper true cylindrical end extending through the upright cylindrical portion of flue $f$ and projecting out through the upper horizontal wall of said flue. The chimney $d$ is of smaller size throughout than the flue $f$, whereby a space is left all around it, as shown, for the passage of the pure hot air. The gases and fumes from the lamp $a$ pass out through chimney $d$, so that none of them reach the incubator proper. A retarding device, which we term the "labyrinth," and which is marked $e$, is placed in chimney $d$, to prevent the undue escape of heat up the chimney. This labyrinth $e$ is composed of a series of circular plates, as shown, united by partitions, which hold them at some distance apart and extend only partly across the diameter of the plates. The plates are provided with openings on alternating sides of the partition, which cause the escaping heat and fumes to take a very circuitous route, and will result in a dissemination of the heat through chimney $d$ into flue $f$. The flue $f$, after reaching the top of the incubator, is turned and runs horizontally and communicates with an opening in the top of the incubator-box. Under this hole or opening is placed a deflector-plate, $f^*$, to throw the heat out laterally. A regulating device consisting of an expansion-disk, $i$, mounted in stirrup $j$ and supported by bracket $h$, is located near one end of the deflector-plate. The expansion-disk and stirrup are swung upon lever $k$, which is fulcrumed by knife-edges on bracket $h$ and has secured to its outer end a connecting-rod, which has a swivel-link, $l$, for adjusting the parts, and a cap or cover, $m$, loose upon it for covering the opening in the incubator-box. Above these parts the rod connects with a damper or valve, $n$, in a short length of pipe in the end of the horizontal portion of flue $f$. On the bottom of the incubator we place a false bottom, $s$, which, as shown in Figs. 7, 8, and 9, is provided with means for securing circulation of the heat under it. On this false bottom $s$ we place the evaporating-pans $r$, which are constructed with shallow holders, and mounted upon short legs or supports, as shown. Over the evaporating-pans on suitable supports are placed the open-work or woven-wire egg trays or screens $q$, and upon these the perforated folding hatching-cages $p$. These cages $p$ consist of a rod or wire bent or formed in rectangular shape, and having perforated side boards, as shown in Figs. 5 and 6, hinged to it with capacity to fold up. The thermometer o is mounted upon pendent cords or connections, as shown in Fig. 10, which connect at the top with a lever or lifting-piece, o', on top of the incubator-box t.

The operation of our improved incubator is as follows: The heating apparatus (a coal-oil lamp) is placed in a chamber at the bottom of the structure. The lamp is surmounted by a chimney which projects into a conical flue connected with the pipe, for carrying off the fumes from the lamp. Above the chimney in the conical flue is placed the device called the "labyrinth," the effect of which is to retard the escape of the heated fumes and conserve a large percentage of otherwise lost heat. Around the conical flue and the pipe for the escape of the fumes is the passage for the pure heated air, by which it is conducted into and through every part and recess of the egg-chamber. Surrounding this air-passage is a space filled with non-conducting material, by which means the heated air is protected and preserved from diffusion in its passage to the egg-chamber. Supposing the valve n to be closed, the air, being heated at a point considerably below the bottom of the egg-chamber, passes downward with much force through the opening at the center of the top of the egg-chamber, impinging upon a plate of metal suspended below the opening, and is thence diffused through the egg-chamber, the general course of the air being from the center of the egg-chamber to the corners of the false bottom, where the only exits for air are located, thence through the chamber under the false bottom, and thence finally through the holes near the center of the true bottom or floor of the machine. Supposing the valve n to be open, the heated air, instead of passing downward through the egg-chamber, passes out through the tube in which the valve is located. If the valve be slightly open, a portion only of the volume of heated air passes downward through the egg-chamber, the portion escaping corresponding to the capacity of the opening of the valve. It follows, therefore, that if more heat is generated than is necessary to maintain a given temperature in the egg-chamber, and if the opening of the valve is more or less, according to the variations in the outside temperature, a uniform heat can be maintained in the egg-chamber. The temperature is ascertained from the thermometer, which is suspended from the top of the egg-chamber at a point where the scale may be read through the window at one side of the chamber. The bulb of the thermometer being considerably lower than the top of the stem, an egg is removed from the tray and the bulb is placed in the center of the vacant space, with its upper side level with the top of the eggs, it being guided to its exact place by the device which extends upward through the top of the egg-chamber. To raise the thermometer when the egg-trays are to be moved, it is only necessary to place anything of the proper size under the piece of wood at the top, through which the suspending-wires pass and are supported by it. The suspending-wire nearest the bulb is slightly bent, and by turning a thumb-piece at its upper end the bulb of the thermometer can be swung to its proper place without handling. The perforated folding hatching-cage is placed on the wire-cloth-bottomed egg-trays only when chicks are hatching, and its purpose is to protect the chicks, after emerging from the shell, from falling off and getting under the egg-trays, and to prevent them from going to other trays and fouling the eggs, which in other incubators leads to considerable loss. By the use of this hatching-cage it is rendered practicable to place eggs in the incubator at any time, whereby space is utilized which would otherwise be lost, and when it is not in use, or being transported, it can be laid flat. Each of the wire-cloth-bottomed egg-trays is placed over and close to a shallow pan of water, which stands upon feet resting upon the false bottom, the space beneath being sufficient for the free passage of heated air underneath, thereby causing the requisite degree of evaporation to provide a constant supply of humidity to the eggs in the trays. As there is no opening in the false bottom, except through its frame near the corners, all of the air passed through the egg-chamber is forced to these corners, thence through the openings, thence through chamber between the false bottom and the true bottom, thence finally through the holes near the center of the true bottom to the outside. The purposes of the false bottom are to constantly pass the heated air from the center of the chamber, the least exposed portion, to the corners of the chamber, the most exposed portions. It thus effectually equalizes the temperature over every part at the egg-level. It also specially protects the bottom of the egg-chamber from the outside cold and permits the temperature of the water in the evaporating-pans to be raised sufficiently high for the purpose intended; and, finally, it prevents a lower outside temperature from reacting through the openings, by reason of the long and tortuous passage the outgoing air is forced to take, while there is no impediment to its free escape.

We do not lay claim to the heat-regulator in this patent, but have shown it as being essential to the successful operation of our incubator.

Having thus fully described our invention, what we claim, and desire to secure by Letters Patent, is—

1. In an incubator, the combination, with the heating device, chimney $d$, and hot-air flue $f$, of the labyrinth $e$, consisting of plates of metal united by partial partitions, and having heat passages or openings on alternating sides of the partitions, the deflector-plate $f^*$, as described, and egg containing or supporting devices, as set forth.

2. In an incubator, the combination, with the egg trays or supports, of the cages $p$, having hinged perforated sides, and a supporting wire or frame to which the same are hinged, as and for the purpose set forth.

3. In an incubator, the combination of the false bottom $s$, the evaporating-pans $r$, placed thereon, the egg-trays $q$, placed over the evaporating-pans, and the folding hatching-cages $p$, placed over the trays, as set forth.

In witness whereof we have hereunto set our hands.

GEORGE E. DAVIS. [L. S.]
CHARLES R. LOOK. [L. S.]

Witnesses:
A. B. SMITH,
GEO. A. HARTFORD.